3,658,837
ANTIOBOTIC α - METHYLDETHIOBIOTIN, αMETHYLBIOTIN, AND THEIR ESTERS

Ladislav J. Hanka and David G. Martin, Kalamazoo, Mich., assignors to The Upjohn Company, Kalamazoo, Mich.

No Drawing. Continuation-in-part of application Ser. No. 736,278, June 12, 1968. This application May 19, 1969, Ser. No. 826,008

Int. Cl. C07d 49/30

U.S. Cl. 260—309.7                                10 Claims

ABSTRACT OF THE DISCLOSURE

Antibiotics α-methyldethiobiotin, α-methylbiotin, and their esters. α-Methyldethiobiotin and its esters have the following formula:

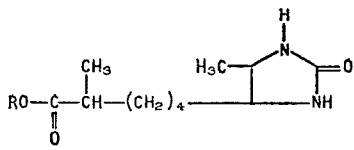

I wherein R is hydrogen or t-butyl, phthalimidomethyl and phenacyl.

α-Methylbiotin and its esters have the following formula:

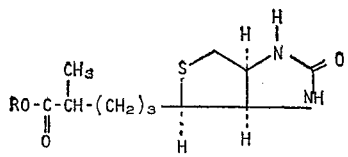

II wherein R is as defined above.

α-Methyldethiobiotin, where R is hydrogen in Formula I, and α-methylbiotin, where R is hydrogen in Formula II, are produced in a lydimycin fermentation. These compounds are active against *Mycobacterium avium* and can be used to control this microorganism which is a known producer of generalized tuberculosis in birds and rabbits.

---

The invention described herein was made in the course of, or under, a contract with the Department of Health, Education, and Welfare.

CROSS REFERENCE TO RELATED APPLICATION

This application is a continuation-in-part of copending application Ser. No. 736,278, filed on June 12, 1968, and now abandoned.

BRIEF SUMMARY OF THE INVENTION

α-Methyldethiobiotin (U–28,559) is the trivial name for α,5 - dimethyl - 2 - oxo - 4 - imidazolidinehexanoic acid. α-Methylbiotin is the trivial name for cis-tetrahydro-α-methyl - 2 - oxo-thieno[3,4-d]imidazoline - 4 - valeric acid. These are acidic compounds. α-Methyldethiobiotin is active against various Gram-positive and Gram-negative microorganisms, for example, *Escherichia coli*, *Mycobacterium avium*, and *Bacillus subtilis*. α-Methyldethiobiotin also has antifungal activity, for example, it is active against *Nocardia asteroides*, *Blastomyces dermititidis*, and *Phialophora verrucosa*. α-Methylbiotin is active against various Gram-positive microorganisms, for example, *Bacillus subtilis*, *Bacillus cereus*, *Mycobacterium avium*, and *Mycobacterium phlei*.

α-Methyldethiobiotin and α-methylbiotin are produced in a lydimycin fermentation as described in Example 1 of U.S. Pat. 3,395,220. The presence of these compounds was heretofore undetected in a lydimycin fermentation.

DETAILED DESCRIPTION

The production of α-methyldethiobiotin and α-methylbiotin in a lydimycin fermentation, as disclosed in U.S. Pat. 3,395,220 employs the microorganism *Streptomyces lydicus*, NRRL 2433. This microorganism is available to the public, without restriction, from the Northern Utilization Research and Development Division, Agricultural Research Service, U.S. Department of Agriculture, Peoria, Ill., U.S.A. α-Methyldethiobiotin and α-methylbiotin also can be produced by another strain of *S. lydicus* having the repository number NRRL 3432. A subculture of this strain also is available to the public, without restriction, from the above-mentioned repository.

α-Methyldethiobiotin and α-methylbiotin are detected in the lydimycin fermentation liquor by a new procedure which involves paper-chromatographing the fermentation liquor in a Sarma 1 system. The developed papergram is bioautographed against *Bacillus subtilis* grown in a synthetic agar medium. The Sarma 1 system consists of a papergram which is developed with the upper phase of a solvent mixture consisting of 1-butanol, methanol, benzene, and water (2:1:1:1). The synthetic medium upon which *Bacillus subtilis* is grown consists of the following:

|  | G. |
|---|---|
| $Na_2HPO_4 \cdot 7H_2O$ | 1.7 |
| $KH_2PO_4$ | 2.0 |
| $(NH_4)_2SO_4$ | 1.0 |
| $MgSO_4$ | 0.1 |
| Glucose | 2.0 |
| Bacto agar [1] | 15.0 |

Distilled water—1 liter.
Metallic ion stock solution [2]—1 ml.

[1] Bacto agar provided by Difco Laboratories, Detroit, Mich.
[2] Metallic ion stock solution consists of the following:

|  | Mcg./ml. |
|---|---|
| $NaMoO_4 \cdot 2H_2O$ | 200 |
| $CoCl_2$ | 100 |
| $CuSO_4$ | 100 |
| $MnSO_4$ | 2 |
| $CaCl_2$ | 25 |
| $FeCl_2 \cdot 4H_2O$ | 5 |
| $ZnCl_2$ | 5 |

$ZnCl_2$ has to be dissolved separately using a drop of 0.1 NHCl for 10 ml. of water. The stock solution is heated to bring all the compounds in solution, kept standing for 24 hours, and sterile filtered.

The above-disclosed procedure for detecting α-methyldethiobiotin and α-methylbiotin in a lydimycin fermentation beer was made available subsequent to the lydimycin invention. Thus, α-methyldethiobiotin and α-methylbiotin present in lydimycin fermentation liquors heretofore was not detected and, accordingly, not recovered or used.

α-Methyldethiobiotin and α-methylbiotin can be recovered from a lydimycin fermentation broth by the use of surface active adsorbents, for example, decolorizing resins and activated carbon (preferred). Advantageously, the lydimycin whole fermentation broth is first filtered at pH 4, or centrifuged to separate the mycelial and undissolved solids from the broth. The clear beer is then passed over an adsorbent, for example, activated carbon. The column is washed with a beer volume of deionized water and then with three column volumes each of 25% methanol in water, 50% methanol, and methanol. α-Methyldethiobiotin, α-methylbiotin, and lydimycin are eluted off the column with 20-column volumes of about 1–5% triethylamine in methanol. The fractions are analyzed by paper chromatography with the Sarma 1 papergram system, described above. Evaporation of the solvent from the eluates, dissolution of the residues in water, and acidification to a pH of about 2.0 affords a crystalline mixture of α-methyldethiobiotin, α-methylbiotin, and lydimycin. Recovery of the individual antibiotics from this antibiotic mixture is readily accomplished by conversion of the antibiotic mixture to an ester form, preferably the phenacyl form. Other suitable esters are tertiary butyl, and phthalimidomethyl. The antibiotic mixture ester is then recrystallized several times from a suitable solvent, for example, ethanol, acetone-ethanol, methylene chloride-ethanol, or methylene chloride-toluene to separate out lydimycin esters substantially free of the esters of α-methyldethiobiotin and α-methylbiotin which remain in the mother liquors.

The mother liquors, containing predominantly the esters of α-methyldethiobiotin and α-methylbiotin, and some lydimycin, are combined and evaporated to a residue. This residue is extracted with toluene saturated with propylene glycol and the extract is submitted to partition column chromatography. Fractions containing only the esters of α-methyldethiobiotin and α-methylbiotin are subjected to further purification over a silica gel chromatography column eluted with 3% ethanol in chloroform to give fractions containing α-methyldethiobiotin ester substantially free of α-methylbiotin ester, and α-methylbiotin ester substantially free of α-methyldethiobiotin ester.

The active fractions from the partition chromatography and silica gel chromatography are ascertained by either paper chromatography using *B. subtilis* grown in a synthetic medium, as described previously, or by thin-layer chromatography. This latter test is preferred. It is performed by spotting test samples on silica gel coated glass slides developed with 5% methanol and chloroform. The active zones are visualized by ultra-violet light. Lydimycin is the most polar, and α-methyldethiobiotin is the least polar, with α-methylbiotin having an intermediate polarity.

The ester group from esters of α-methyldethiobiotin and α-methylbiotin can be removed, advantageously, with a base, for example, sodium thiophenoxide, sodium phenoxide, ammonia, and sodium hydroxide, to afford crystalline α-methyldethiobiotin and α-methylbiotin, respectively. These crystals can be purified further by recrystallization from acetone.

The above method for purifying α-methyldethiobiotin and α-methylbiotin is especially good for separating these antibiotics from material containing α-methyldethiobiotin, α-methylbiotin, and lydimycin since the esters of α-methyldethiobiotin and α-methylbiotin are cleanly isolated by chromatography on a silica gel column.

α-Methyldethiobiotin also can be recovered from a lydimycin fermentation broth by filtering the whole broth at pH 4, passing the filtrate over activated carbon, eluting the activated carbon with 3-column volumes each of 25% methanol in water, 50% methanol, and substantially anhydrous methanol. This elution is then followed by an elution of the column with about 20-column volumes of 5% triethylamine in methanol. The eluate fractions containing α-methyldethiobiotin substantially free of lydimycin can be concentrated to asolid material and purified by silica gel chromatography.

Alternatively, the solid material containing α-methyldethiobiotin substantially free of lydimycin can be purified by first dissolving the solid material in ammonium hydroxide, filtering the solution, and then acidifying the solution to a pH of about 2.0 to yield essentially pure α-methyldethiobiotin crystals. Recrystallization from acetone results in further purification of the α-methyldethiobiotin crystals.

Salts of α-methyldethiobiotin and α-methylbiotin are formed employing the free acid of these compounds and an inorganic or organic base. These salts can be prepared, for example, by dissolving α-methyldethiobiotin or α-methylbiotin free acid in an alcohol, for example, methanol and ethanol, adding a dilute base until the pH of the solution is about 10.0 to 11.0, and concentrating and drying the solution to provide a dried residue consisting of the base salt. Salts which can be formed include the sodium, potassium, and calcium salts. Other salts, including those with organic bases such as primary, secondary, and tertiary monoamines, as well as the polyamines, also can be formed using the above-described or other commonly employed procedures. Other valuable salts are obtained with therapeutically effective bases which impart additional therapeutic effects thereto. Such bases are, for example, the purine bases such as theophyllin, theobromin, caffeine, or derivatives of such purine bases; antihistaminic bases which are capable of forming salts with weak acids; pyridine compounds such as nicotinic acid amide, isonicotinic acid hydrazide, and the like; phenylalkyl amines such as adrenaline, ephredrine, and the like; choline, and others. Salts of α-methyldethiobiotin and α-methylbiotin can be used for the same biological purposes as the free acid.

α-Methyldethiobiotin and α-methylbiotin have an antibacterial spectrum as shown in the following tables. The antibacterial spectrum was determined by a standard disc plate agar diffusion test using 13 mm. size paper discs.

The microorganisms were grown in the following media:

*B. subtilis*: Streptomycin assay agar—BBL
*S. lutea*: Seed agar—BBL
*E. coli*: Nutrient agar—BBL
*S. aureus*: Nutrient agar—BBL
*M. avium*: Brain heart infusion agar—Difco The synthetic media had the following composition:

|  | *B. subtilis* | *E. coli* |
|---|---|---|
| $Na_2HPO_4 \cdot 7H_2O$, g | 1.5 | 2.2 |
| $KH_2PO_4$, g | 4.3 | 1.0 |
| $(NH_4)_2SO_4$, g | 1.0 | 1.0 |
| $MgSO_4$, g | 0.1 | 0.1 |
| Glucose, g | 2.0 | 2.0 |
| Agar, g | 15.0 | 15.0 |
| Distilled water, l | 1 | 1 |
| Metallic ion stock solution a, ml | 1 | |
| Final pH | 6.2 | 6.7 | a Metallic ion stock solution:

| Compound: | Concentration |
|---|---|
| $NaMoO_4 \cdot 2H_2O$ | mcg./ml 200 |
| $CoCl_2$ | mcg./ml 100 |
| $CuSO_4$ | mcg./ml 100 |
| $MnSO_4$ | mg./ml 2 |
| $CaCl_2$ | mg./ml 25 |
| $FeCl_2 \cdot 4H_2O$ | mg./ml 5 |
| $ZnCl_2$ [1] | mg./ml 5 |

[1] $ZnCl_2$ has to be dissolved separately using a drop of 0.1 N HCl for 10 ml. of water.

The stock solution is heated to bring all the compounds in solution, kept standing for 24 hours and sterile filtered.

*Antibacterial activity of α-methyldethiobiotin*

Test organism: Zone size (in mm.) at a concentration of 1 mg./ml.
  *Bacillus subtilis* _____ 0
  *Bacillus subtilis* (synthetic medium) _____ 67
  *Sarcina lutea* _____ 0
  *Escherichia coli* (hazy) _____ 18
  *Escherichia coli* (synthetic medium) _____ 22
  *Staphplococcus aureus* _____ 0
  *Mycobacterium avium* _____ 33

α-Methyldethiobiotin does not show a zone of inhibition against *Saccharomyces pastorianus* on the above test at a concentration of 1 mg./ml. At a concentration of 5 mg./ml. in the above test, α-methyldethiobiotin gives a 25 mm. zone of inhibition against *S. pastorianus*. In comparison, the antibiotic lydimycin shows a zone of inhibition against *S. pastorianus* at a concentration of about 5–10 mcg./ml.

Antibacterial activity of α-methylbiotin

| Test organism: | Zone size (in mm.) at a concentration of 686 mcg./ml. |
|---|---|
| Bacillus cereus | 24 |
| Bacillus subtilis (grown in nutrient agar) | 17 |
| Bacillus subtilis (grown in synthetic agar) | 70 |
| Mycobacterium avium | 46 |
| Mycobacterium phlei | 35 |

α-Methylbiotin does not show a zone of inhibition against Saccharomyces pastorianus on the above test at a concentration of 686 mcg./ml.

α-Methyldethiobiotin has antifungal activity as shown in the following table. The antifungal spectrum was determined by a standard agar dilution plate test.

Antifungal activity of α-methyldethiobiotin

| Test organism: | Minimum inhibitory concentration in mcg./ml. |
|---|---|
| Nocardia asteroides | 500 |
| Blastomyces dermatitidis | 500 |
| Phialophora verrucosa | 500 |

The new compounds of the invention, α-methyldethiobiotin and α-methylbiotin, can be used in birds and rabbits to control the organism Mycobacterium avium which is a known producer of generalized tuberculosis in these animals. They also can be used in petroleum product storage to control the microorganism Bacillus subtilis which is a known slime and corrosion producer in petroleum products storage. α-Methyldethiobiotin also can be used to inhibit the microorganism Escherichia coli which is a known odor producer and possible source of trouble in papermill systems.

The novel phenylacyl esters of α-methyldethiobiotin and α-methylbiotin are active against Mycobacterium avium and Bacillus subtilis. Thus, these compounds can be used to inhibit these microorganisms. Further, the esters of α-methyldethiobiotin and α-methylbiotin are useful in a purification process, as described herein, to separate α-methyldethiobiotin and α-methylbiotin from lydimycin.

The following examples are illustrative of the process and products of the present invention but are not to be construed as limiting. All percentages are by weight and all solvent mixture proportions are by volume unless otherwise noted.

EXAMPLE 1.—α-METHYLDETHIOBIOTIN

Part A.—Fermentation

A soil stock of Streptomyces lydicus, NRRL 3432, is used to inoculate a series of 1-liter Erlenmeyer flasks each containing 250 ml. of a sterile preseed medium consisting of the following ingredients:

| | G./liter |
|---|---|
| Glucose monohydrate | 25 |
| Pharmamedia [1] | 25 |
| Tap water, q.s., 1 liter. | |

[1] Pharmamedia is an industrial grade of cottonseed flour produced by Traders Oil Mill Company, Fort Worth, Tex.

The preseed inoculum is grown for 45 to 50 hours at 28° C. on a reciprocating shaker.

Preseed inoculum, as described above, is used to inoculate a 3800 liter seed tank containing 1250 liters of the following sterile seed medium:

| | |
|---|---|
| Glucose monohydrate | g./liter__ 25 |
| Pharmamedia | do__ 25 |
| Ucon LB–625 [1] | ml./liter__ 0.4 |
| Tap water, q.s., 1 liter. | |

[1] Ucon LB–625 is an antifoaming agent supplied by Union Carbide Corporation.

The pH of the medium is adjusted to 7.2 with 50% ammonium hydroxide before sterilization.

The seed tank is maintained at a temperature of 28° C. for 45 to 50 hours with an aeration rate of 50 s.c.f.m. (standard cubic feet per minute) and agitation at the rate of 150 r.p.m.

The seed inoculum, described above, is used to inoculate a 15,000 gallon fermentation tank containing 50,000 liters of the following sterile fermentation medium:

| | |
|---|---|
| Glucose monohydrate | g./liter__ 10 |
| Dextrin | do__ 30 |
| Pabst's yeast [1] | do__ 10 |
| Cottonseed meal | do__ 10 |
| Ucon LB–625 | ml./liter__ 0.2 |
| Tap water, q.s., 1 liter. | |

[1] Brewer's yeast obtained from the Pabst Brewing Company.

The pH of the medium is adjusted to 7.2 with 50% sodium hydroxide before sterilization. The Ucon LB–625 is added after the pH adjustment. The fermentation tank is maintained at a temperature of 35° C. for about 94 hours with an air flow rate of about 800 s.c.f.m. and agitation at a rate of about 83 r.p.m.

Part B.—Recovery (1) Whole beer (46,200 liters) from a fermentation, as described above, is filtered at pH 4 with the aid of diatomaceous earth. The clear beer is adsorbed on 545 kg. of degassed carbon (Pittsburgh Chemicals CAL carbon) and eluted with 9,000 liters of 80% acetone; 600-liter fractions are collected. The fractions are spotted against a tray of the assay microorganism Saccharomyces pastorianus to determine the active fractions. The active fractions (7,800 liters) are stripped of acetone and adsorbed on 200 lbs. of degassed CAL carbon. The carbon is washed with water and then gradiently eluted with 3200 liters of 50% to 100% acetone. The first 420 liters are concentrated to 100 liters and adsorbed on 10 kg. of degassed CAL carbon and then gradiently eluted with 260 liters of 50% to 100% acetone. The first 40 liters are concentrated to 4.5 liters of a viscous solution containing 3104 g. of solids assaying 1 biounit/mg. against S. pastorianus. (A biounit is defined as the concentration of the antibiotic which gives a 20 mm. zone of inhibition under the standard assay conditions. Thus, if for example a fermentation beer has to be diluted $\frac{1}{100}$ to give the 20 mm. zone of inhibition, the potency of such beer is 100 Bu. per ml.) The next 20 liters are concentrated to 4 liters of solution containing 548 g. of solids assaying 3 biounits/mg. against S. pastorianus. These two concentrates are stored under refrigeration after which a solid separates from each concentrate. The first more viscous concentrate is diluted with 3 volumes of water, chilled overnight, and filtered. The collected solid is washed with water and dried; yield, 10.96 g. of crude solid rich in α-methyldethiobiotin. The presence of α-methyldethiobiotin is shown by paper chromatography with the Sarma No. 1 system, described above. The second concentrate, described above, afforded 15.25 g. of a solid rich in α-methyldethiobiotin.

(2) α-Methyldethiobiotin also can be recovered from the fermentation beer described in Part A by the following recovery process. The whole fermentation beer is filtered at a pH of about 4.0 with the aid of diatomaceous earth. The clear beer is adsorbed on 20% beer volume of degassed CAL carbon in a chromatographic column. The column is washed with a beer volume of deionized water and then with 3-column volumes each of 25% methanol in water, 50% methanol, and methanol. α-Methyldethiobiotin is eluted from the column, along with any lydimycin which may be present, with 20-column volumes of 5% triethylamine in methanol. The eluate fractions are analyzed by paper chromatography with the Sarma No. 1 system.

Part C.—Purification

A portion of the crude solids containing α-methyldethiobiotin (6.3 g.), obtained in Part B, is dissolved in 50 ml. of the upper phase obtained by mixing butanol:methanol:benzene:water (2:1:1:1) and adsorbed onto a column prepared by slurrying 600 g. of silica gel (No. 7734

E. Merck AG., Darmstadt), in the same solvent mixture. The column is eluted with the same solvent mixture and 20 ml. fractions are collected. Fractions containing α-methyldethiobiotin are detected by dipping paper discs in every other fraction, drying the discs in a fume hood for 2 hours, and applying them to a tray of *Bacillus subtilis* (synthetic medium). Activity against *Bacillus subtilis* discloses the presence of α-methyldethiobiotin. Fractions containing α-methyldethiobiotin, as determined by the above *Bacillus subtilis* assay procedure, are evaporated under reduced pressure; yield, 5.71 g. of residue. This residue is triturated with water adjusted to pH 2.5; yield, 4.54 g. of crystalline α-methyldethiobiotin having a melting point of 160–161° C. The crystals of α-methyldethiobiotin are dissolved in refluxing acetone and the solution clarified with diatomaceous earth. The filtrate is concentrated; yield, 3.37 g. of α-methyldethiobiotin crystals having a melting point of 161–162° C. Upon recrystallization of these crystals from acetone there is obtained 3.17 g. of crystalline α-methyldethiobiotin having a melting point of 161.5–162.5° C.

An alternate procedure for purifying α-methyldethiobiotin from the solids obtained in Part B is as follows. Crude solid as prepared in Part B (10.96 g.) is dissolved in 50 ml. of 1 N NH₄OH and filtered with the aid of diatomaceous earth. The filtrate is acidified with hydrochloric acid to a pH of about 2.0 and crystals of α-methyldethiobiotin form; yield, 9.34 g. of crystalline α-methyldethiobiotin having a melting point of 160.5–161.5° C. These crystals of α-methyldethiobiotin are recrystallized from acetone and then isopropanol; yield, 7.30 g. of crystalline α-methyldethiobiotin having a melting point of 161–162° C.

EXAMPLE 2

Eluate fractions containing α-methyldethiobiotin, obtained as described in Part B(2), are evaporated to dryness and dissolved in a minimum volume of water required to effect solution. The solution is adjusted to a pH of 2.0 with sulfuric acid and chilled for about 4 days. The resulting solid is collected, washed with cold water and dried. This solid is dissolved in dimethylformamide (19 ml./g.) and triethylamine (1.2 ml./g.) and treated with an equal weight of phenacyl bromide at room temperature for about 1–2 hours. (This reaction can be carried out at 0° C. for longer periods of time or at higher temperatures up to 60° C. for a shorter period of time. At least one equivalent or a slight excess of phenacyl bromide can be used. One equivalent of triethylamine or an excess also can be used.) The resulting solution is poured into 20 volumes of ice cold water and the resulting solid is collected, washed with water and dried. This solid is dissolved in chloroform and chromatographed on silica gel (100 g./g.; E. Merck Ag., Darmstadt, No. 7734). Elution of the silica gel column with 5% methanol in chloroform yields the phenacyl ester of α-methyldethiobiotin first and then the phenacyl ester of lydimycin. After recrystallization from acetone, the phenacyl ester of α-methyldethiobiotin, melting point 128–129° C., is hydrolyzed in the following manner. 10 ml. of 1 N NaOH is added to a solution of 1.26 g. of the phenacyl ester of α-methyldethiobiotin in 200 ml. of refluxing isopropanol. After 10 minutes at reflux, the solution is cooled and evaporated to a residue. The residue is dissolved in water, clarified with diatomaceous earth, and then acidified to a pH of about 2.0 with hydrochloric acid. The solid which forms is collected, washed with cold water, dried, and recrystallized from acetone; yield, 0.63 g. of α-methyldethiobiotin crystals having a melting point of 160.5–162° C. (The hydrolysis of the ester group also can be carried out at room temperature by stirring a solution of the phenacyl ester of α-methyldethiobiotin in tetrahydrofuran with 1 N NaOH for about 4 days.)

EXAMPLE 3

Upon substituting N-chloromethylphthalimide for phenacyl bromide in Example 2, there is obtained the phthalimidomethyl ester of α-methyldethiobiotin. This ester is readily cleaved at room temperature with anhydrous hydrogen chloride in ethyl acetate or dioxane solution, with hydrogen bromide in acetic acid, or with hydrazine hydrate in ethanol to yield α-methyldethiobiotin.

Alternatively, the tertiary butyl ester of α-methyldethiobiotin can be prepared by reacting its acid chloride with tertiary butyl alcohol and triethylamine at 0° C. The tertiary butyl ester can be easily cleaved at room temperature with hydrogen chloride in dioxane or with sulfuric acid to yield α-methyldethiobiotin.

EXAMPLE 4

*Lydimycin, α-methylbiotin, and α-methyldethiobiotin*

Whole beer (46,200 liters) from a fermentation, as described in Example 1, Part A, is adjusted to pH 4.0 with sulfuric acid and filtered with the aid of diatomaceous earth. The filter cake is washed with 0.1 beer-volume of water and the cake is discarded. The clear beer is adsorbed on 545 kg. of degassed carbon (Pittsburgh Chemicals CAL carbon) and eluted with 9000 liters of 80% acetone; 600-liter fractions are collected. The fractions are spotted against a tray of the assay microorganism *Saccharomyces pastorianus* to determine thee active fractions.

The active fractions (7800 l.) are stripped of acetone and adsorbed on 200 lbs. of degassed CAL carbon. The carbon is washed with water and then gradiently eluted with 3200 liters of 50% to 100% acetone. The first 420 liters are processed for α-methyldethiobiotin as described in Example 1, Part B. The following eluates are pooled and concentrated to an aqueous solution which is freeze dried affording 8712 g. of residue (3.3 Bu./mg. against *S. pastorianus*). This residue is dissolved in 5 l. of the lower phase of a mixture of ethylacetate:cyclohexane: McIlvaine's pH 3 buffer (Handbook of Chemistry and Physics, 22nd Edition, Chemical Rubber Publishing Co., p. 960) in the proportions 16:4:1 and homogenized with 10 kg. of Dicalite 4200 (a diatomaceous earth produced by Great Lakes Carbon Corp., New York, N.Y.) and upper phase. The mixture is placed on top of a column containing 52 kgm. of Dicalite 4200 which had been slurried in upper phase with 20.8 l. of lower phase and the column is eluted with 1600 l. of upper phase. Concentration of the active fractions (*S. pastorianus* assay) to an aqueous solution and chilling affords 15.9 g. of impure lydimycin assaying 2000–2260 Bu./mg. against *S. pastorianus*, and 8.3 g. of less pure lydimycin assaying 555 Bu./mg. Rechromatography of the mother liquor residue with the same solvent system affords an additional 7.3 g. of lydimycin assaying 2000 Bu./mg. against *S. pastorianus*.

Paper strip analysis (Sarma 1 system) of these solids indicates two major zones of approximately equal size. These solids are extracted with an excess of 1 N NH₄OH. After clarification with diatomaceous earth, the extract is acidified to a pH of about 2.0 with hydrochloric acid; yield, 24.3 g. of lydimycin which shows two major zones of activity on the Sarma 1 system. This 24.3 g. of crude lydmycin is dissolved in a solution of 490 ml. of dimethylformamide and 29.2 ml. of triethylamine. After adding 22.08 g. of phenacyl bromide, the solution is stirred at room temperature for 1.5 hours. The reaction mixture is then poured into 9.8 liters of ice water. The resulting solid is collected, washed with water, then with Skellysolve B (isomeric hexanes), and dried; yield, 25.53 g. of crude lydimycin phenacyl ester. Paper strip analysis of this material using a sheet saturated with 1:1 methanol: propylene glycol, and dried at 37° C. for 10 minutes followed by development with toluene saturated with propylene glycol, shows two zones of activity against *B. subtilis* grown on synthetic agar. These zones show the presence of lydimycin phenacyl ester and α-methylbiotin phenacyl ester.

The crude lydimycin phenacyl ester is recrystallized three times from ethanol and three times from methylene chloride-toluene (the material is dissolved in refluxing methylene chloride and the methylene chloride is displaced with toluene) affording 19.54 g., of pure lydimycin phenacyl ester crystals. The phenacyl ester is removed from the toluene insoluble lydimycin phenacyl ester by the following procedure. A solution of 1.800 g. of the phenacyl ester in 1 l. of tetrahydrofuran is stirred under an atmosphere of nitrogen with 10 ml. of 1 N sodium hydroxide for 24 hr. at room temperature. The solid which separates is collected, washed with acetone, and dissolved in water (approximately 100 ml.). The aqueous solution is filtered and acidified affording 1.029 g. (85%) of lydimycin assaying 16,000 Bu./mg. against *S. pastorianus*, M.P. 251.5–252° C.

Mother liquor residues from the recrystallizations, described above, are extracted with toluene saturated with propylene glycol and the extract (1.41 g.) is submitted to partition chromatography prepared as follows: Toluene (5 liters) and propylene glycol (600 ml.) are agitated and the layers separated. Diatomaceous earth (1200 g.) is suspended in the upper phase, stirred for 30 minutes with 400 ml. of the lower phase, and then poured into a chromatographic column. The extract, described above, is drained onto the column which is then eluted with 15 l. of upper phase while collecting 50 ml. fractions. Active fractions are determined by applying paper discs saturated with the test fraction to a tray of *B. subtilis* (grown in synthetic agar) and then analyzed by paper chromatography, as described above, and thin-layer chromatography (5% methanol in chloroform on silica gel detected by U.V.). Fraction 210 shows a larger *B. subtilis* zone moving with α-methylbiotin than the zone moving with α-methyldethiobiotin but the U.V. analysis indicates that α-methyldethiobiotin is the major material present. (α-Methyldethiobiotin is less polar than α-methylbiotin.)

Evaporation of fractions 210–258 leaves 70 mg. of residue which is chromatographed on 30 g. of silica gel (Merck, Darmstadt, No. 7734). The column is eluted with 3% ethanol in chloroform and 20 ml. fractions are collected and spotted against *B. subtilis* grown on synthetic agar, as described above. Again, active fractions are analyzed by paper strip chromatography using the microorganism *B. subtilis* (synthetic medium), and thin-layer chromatography, as described above. Fractions 24–32 consist of essentially pure α-methylbiotin phenacyl ester.

A solution of α-methylbotin phenacyl ester (3 mg.) in methanol (3 ml.) is treated with 0.02 ml. of 1 N NaOH under an atmosphere of nitrogen. The solution is kept at room temperature for 30 minutes and then warmed at 50° C. for 40 minutes. The methanol is evaporated and the residue is dissolved in 3 ml. of water and a paper chromatogram of the filtrate (Sarma 1 system) shows the presence of α-methylbiotin.

*Characterization of α-methyldethiobiotin*

Crystals: White
Titration: pKa' 4.65; eq. wt. 233
Elemental analysis.—Calc'd for $C_{11}H_{20}N_2O_3$ (percent): C, 57.87; H, 8.83; N, 12.27. Found (percent): C, 58.02, 57.99; H, 8.70, 8.78; N, 12.41, 12.18.
Molecular weight: Calc'd: 228.1474. Determined: 228.1472 (high resolution mass spectrometer)
Optical rotation:

$$[\alpha]_{26}^{D} = -2°$$

(c, 0.98 in 95% EtOH).

Solubility: α-Methyldethiobiotin is very soluble in methanol, ethanol, aqueous ammonium hydroxide and alkali; it is soluble in isopropanol and acetone; it is relatively insoluble in Skellysolve B (isomeric hexanes) cyclohexane, ethyl acetate, methylene chloride, and benzene.

α-Methylbiotin is characterized, advantageously, as its phenacyl ester. Mass spectroscopy of the phenacyl ester of α-methylbiotin shows a measured mass of 376.1456.

The theoretical is 376.1456 for $C_{19}H_{24}N_2O_4S$. Mass spectroscopy of the phenacyl ester of α-methylbiotin also shows a peak at 257.0949. This corresponds to the theoretical of 257.0959 for α-methylbiotin $$(C_{11}H_{17}N_2O_3S)$$

Optical Rotary Dispersion (ORD) and NMR show that the methyl in α-methylbiotin is α to the carboxyl group.

We claim:
1. A compound, α-methyldethiobiotin, which is substantially free from lydimycin, and having the following structural formula:

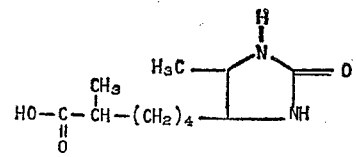

I or its pharmaceutically acceptable salts.

2. A compound as defined in claim 1, α-methyldethiobiotin, in its crystalline form.

3. A compound selected from the group consisting of α-methyldethiobiotin, according to claim 1, or pharmaceutically acceptable salts thereof with alkali metals, alkaline earth metals, and amines selected from the group consisting of primary, secondary, and tertiary monoamines, and polyamines.

4. A compound selected from the group consisting of the t-butyl, phthalimidomethyl, and phenacyl esters of α-methyldethiobiotin.

5. Phenacyl ester of α-methyldethiobiotin according to claim 4.

6. A compound, α-methylbiotin, which is substantially free from lydimycin, and having the following structural formula:

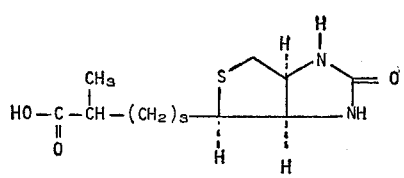

II or its pharmaceutically acceptable salts.

7. A compound as defined in claim 6, α-methylbiotin, in its crystalline form.

8. A compound selected from the group consisting of α-methylbiotin, according to claim 6, or pharmaceutically acceptable salts thereof with alkali metals, alkaline earth metals, and amines selected from the group consisting of primary, secondary, and tertiary monoamines, and polyamines.

9. A compound selected from the group consisting of t-butyl, phthalimidomethyl, and phenacyl esters of α-methyldethiobiotin.

10. Phenacyl ester of α-methylbiotin, according to claim 9.

References Cited
UNITED STATES PATENTS

| | | | |
|---|---|---|---|
| 2,466,004 | 4/1949 | Cheney et al. | 260—309.7 |
| 2,489,236 | 11/1949 | Goldberg et al. | 260—309.7 |
| 2,492,373 | 12/1949 | Wood et al. | 260—309.7 |
| 2,538,096 | 1/1951 | Harris et al. | 260—309.7 |
| 3,395,220 | 7/1968 | Bergy et al. | 424—117 |

NATALIE TROUSOF, Primary Examiner

U.S. Cl. X.R.
195—80; 424—273

UNITED STATES PATENT OFFICE
CERTIFICATE OF CORRECTION

Patent No. 3,658,837          Dated April 25, 1972

Inventor(s) Ladislav J. Hanka and David G. Martin

It is certified that error appears in the above-identified patent and that said Letters Patent are hereby corrected as shown below:

Column 2, lines 42-47, for "Mcg./ml."  read -- 200 mcg./ml.
                            200              100 mcg./ml.
                            100              100 mcg./ml.
                            100                2 mg./ml.
                              2               25 mg./ml.
                             25                5 mg./ml.
                              5                5 mg./ml. --
                              5

Column 3, line 57, for "asolid" read -- a solid --. Column 4, line 63, for "Escherichia coli (hazy) ------ 18" read -- Escherichia coli ----- 18 (hazy)- Column 8, line 24, for "thee" read -- the --; line 59, for "lydmycin" read -- lydimycin --. Column 9, line 69, for "and alkali;" read -- and aqueous alkali; --.

Signed and sealed this 31st day of October 1972.

(SEAL)
Attest:

EDWARD M. FLETCHER, JR.　　　　　　　ROBERT GOTTSCHALK
Attesting Officer　　　　　　　　　　Commissioner of Patents